Patented Nov. 2, 1926.

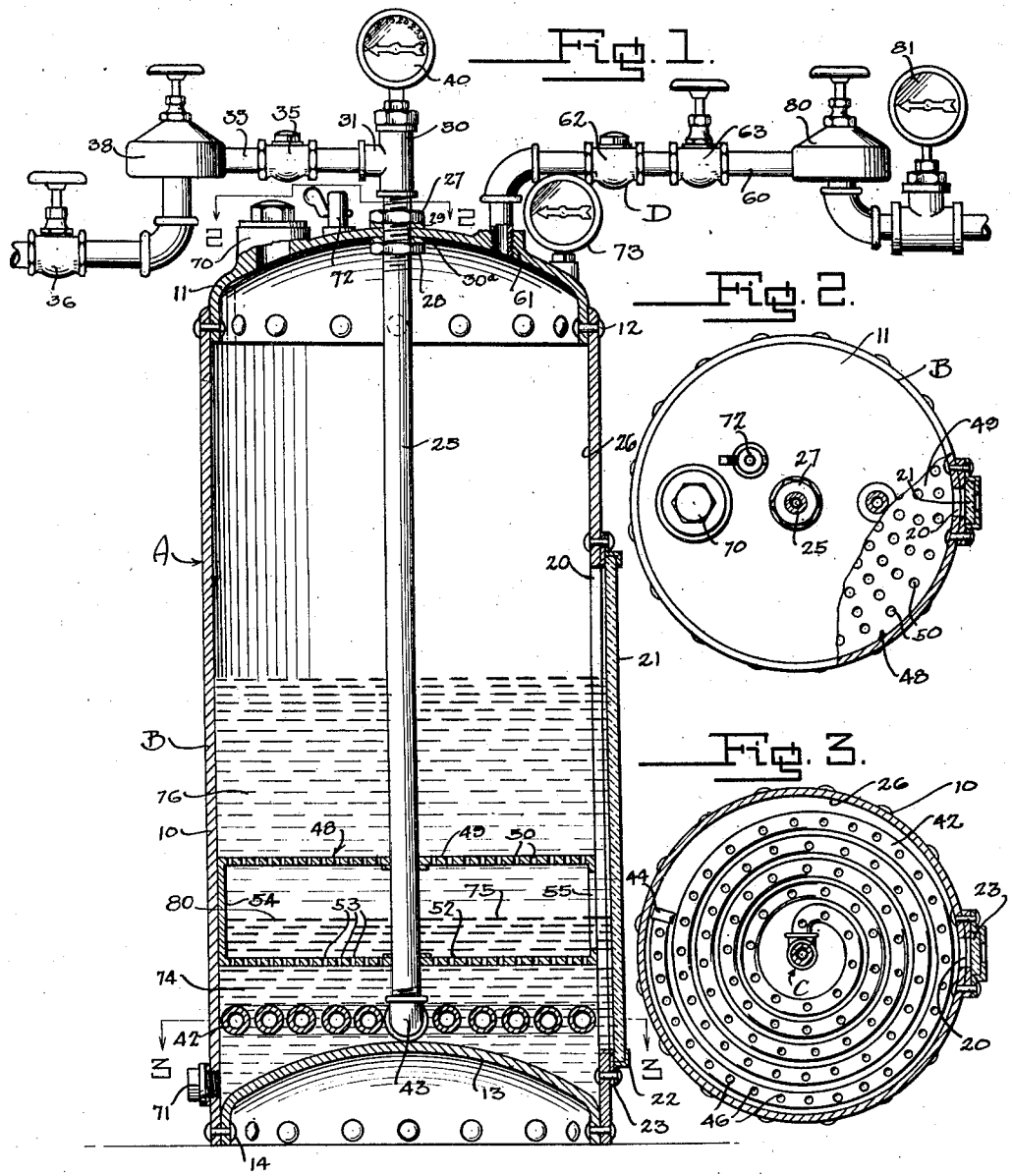

1,605,251

UNITED STATES PATENT OFFICE.

MARION B. MacMILLAN AND EUGENE R. LANGLEY, OF PERRY POINT, MARYLAND.

GAS-GENERATING PROCESS.

Application filed August 3, 1925. Serial No. 47,882.

This invention relates to an improved process for the generation or manufacture of a combustible gas.

The primary object of this invention is the provision of an improved process for the manufacture of a combustible gas particularly desirable for use in place of natural or efficient artificial gas, which is highly inflammable for commercial or home use.

A further object of this invention is the provision of an improved air gas manufactured after a special process to produce a highly inflammable gas capable of producing a blue or white flame.

A further object of this invention is the provision of an improved process for the production of a highly inflammable gas which may be manufactured for home use, or for such commercial use as in gas annealing ovens; in the operation of low pressure torches for automobile repair and battery repair work, where it is used for burning lead; and for use in brazing.

The further object of this invention is the provision of a process which may be carried out with apparatus such as herein described, and set forth in our co-pending application, Serial No. 16,240, filed March 17, 1925.

Other objects and advantages of this invention will be apparent during the course of the following detailed description.

In the accompanying drawing forming a part of this specification, and wherein similar reference characters designate corresponding parts throughout the several views, Figure 1 is a vertical sectional view taken through the improved apparatus, showing details thereof used for the production of the improved gas.

Figure 2 is a fragmentary plan view of the apparatus illustrated in Figure 1.

Figure 3 is a cross sectional view taken substantially on the line 3—3 of Figure 1.

In the drawing, wherein for the purpose of illustration is shown only a preferred embodiment of this invention, the letter A may generally designate the improved apparatus which may comprise a tank B; means C for feeding and baffling air and water vapor at natural temperatures in the tank B; and outlet means D associated with the tank B.

The tank B preferably is cylindrical in form, including the cylindrical shaped body 10 having a top dome-shaped wall 11 which may be riveted as at 12 to the body 10. The tank furthermore includes the concavo-convex bottom wall structure 13, which may be riveted or otherwise welded, as at 14, after the assembly of the feed and baffling structure within the tank, as will be subsequently mentioned. The tank is adapted to receive liquids of different specific gravities, which tend to stratify in the tank, and the liquid level of which must be determined. To this end, the body 10 of the tank B preferably is provided with a longitudinal slot 20 therealong, over which a transparent glass closure 21 is held in a leak-proof manner, as by means 22; the means 22 including a gasket 23 which may be of material not susceptible of deterioration incident to use of the liquids within the tank. This closure 21 forms a gauge for determining the liquid level of the different liquids in the tank, and to ascertain the proportions in which said liquids appear in the tank.

Referring to the air feed and baffle means C, the same includes a feed conduit or pipe 25 which is vertically positioned through the top wall of the tank B, and extends axially through the compartment 26 of the tank to adjacent the bottom 13 thereof. At its upper end this conduit 25 is screw threaded, and is provided with the clamping nuts 27 and 28 exteriorly and interiorly of the top wall 11 of the tank B respectively; washers 29 and 30ª being provided for clamping against the exterior and interior surfaces of the wall 11 by the nuts 27 and 28, to provide a leak-proof connection of the pipe 25 to the top wall. At its exterior end the pipe 25 is provided with a T coupling 30, provided with a lateral branch 31 in which the feed pipe or conduit 33 is connected.

Air under pressure is adapted to be fed through the line 33 into the feed pipe 25, and in this line or pipe 33 a check valve 35 is provided to prevent return passage of the air after entry through the conduit 25. A manually operated globe valve 36 is provided in the pipe 33 which may be used to shut off the entire supply of air from the tank B, and it is also preferred to provide a pressure regulating valve 38 in the conduit 33 between the valves 35 and 36, for the purpose of regulating the pressure of the air admitted to the feed pipe 25. The coupling 30 is also used to support a pressure gauge 40, which measures the pressure after passing the pressure valve 38.

At its lower end, and just above the bottom wall 13 of the tank B, the feed pipe 25 is connected to the center of a horizontally positioned spiral coil 42 by means of a detachable coupling 43; and the outer end of the coil 42 is plugged, as by a cap 44, of any approved character. The coil 42 is provided with minute perforations or openings 46 therein, through which the air under pressure escapes from the coil, as will be subsequently mentioned.

Supported upon the conduit 25 upwardly of the coil 42 is a drum 48, preferably of copper, which may be welded or soldered to the conduit 25, and which includes the top baffle plate 49 having a series of minute perforations 50 therein, and a bottom plate 52 likewise having a series of minute perforations 53 therein. The said drum is axially positioned on the pipe 25, and the plates 49 and 52 extend entirely across the compartment of the tank B into sealing abutment against the inner sides of the walls thereof, although it is preferred that the side wall 54 of the said drum 48 be slotted as at 55 to render visible the liquid level condition within the drum.

It is preferred to provide a pressure safety valve 72 upon the top of the tank B, for venting the gas at a predetermined pressure from the tank. A pressure gauge 73 may also be provided on the tank B for determining the pressure of the gas therein.

The outlet means D includes the pipe 60 detachably connected, as at 61, in the wall 11 at the top of the tank B; said pipe 60 having a check valve 62 therein, and a manually operated globe valve 63. It is preferred to provide a pressure regulating valve 80 in the pipe 60, and a pressure gauge 81 on the opposite side of the valve 80 from the tank B.

The assembling of the parts of the apparatus is accomplished in a manner to facilitate manufacture. The pipe 25 first receives the drum 48, which is welded or soldered in position thereon in proper spaced relation to the lower end of said pipe 25, and the coil 42 is next assembled on the lower end of the pipe by the coupling 43. The nut 28 is then threaded upon the upper ends of the pipe 25, and the washer 30ª placed on said nut. With these parts of the apparatus A in assembled relation, they are slipped upwardly into the compartment 26 of the tank B; the bottom wall 13 of course not having yet been placed, and the upper end of the pipe 25 is extended through the top wall 11 of the tank B and receives the clamping nut 27 and washer 29 thereon as is illustrated in Figure 1 of the drawing. After the coil 42 and the baffling drum 48 are positioned in the tank B, the bottom wall structure 13 may be riveted or otherwise secured in place.

A filler cap structure 70 is preferably provided on the top wall 11, through which the liquids may be fed into the tank B. A drain and clean-out plug 71 may be positioned in the tank B in the lower portion of the body 10 adjacent the bottom wall 13.

Referring more particularly to the use of the improved air gas generator A, water or other non-combustible liquid is fed into the tank B through the filling opening 70, to a level 75 which is at a point between the baffle plates 49 and 52 of the baffle drum 48. A volatile combustible liquid 76, such as gasoline, is then fed into the tank in hereinafter mentioned proportions, and the gasoline extends to a level 80 which is at a point considerably above the baffle drum 48, so that a considerable head of the volatile liquid is above the baffle plate 49, through which the moistened air must pass to be charged for the purpose of generating gas. A considerable space is provided in the tank B above the liquid level at the top of 76, for receiving the gas, which may be drawn off through the outlet means D in any approved manner.

Air under proper pressure, above atmospheric pressure, is fed through the line 33 into the pipe 25 and is forced downwardly therethrough and passes through the coil 42 and therefrom through the perforations 46. This air bubbles upwardly through the water 74 in the lower part of the tank B, and passing therethrough absorbs moisture from the water. The moistened air is considerably divided by bubbling up through the minute perforations 53 of the lower baffle 52, and passes into the upper stratification of volatile combustible liquid 76, and is charged by so passing therethrough. The moistened air and partly charged air is further divided by bubbling through the perforations 50 of the upper baffle plate 49. After passing through the column of gasoline or volatile liquid over the baffle drum 48, the air passes into the upper space in the tank B in the form of water and gasoline saturated air gas, producing a highly combustible gas which produces a blue and white flame when burning.

The combustible gas produced after the process herein described, is one which remains efficient for an indefinite period of time. The volatile liquid while preferably gasoline may be alcohol. The relative positioning of the baffles at either side of the plane of stratification of the water and volatile liquid is an important feature which enables the proper baffling of the divided air through the liquids, for thorough saturation. The water and the volatile combustible liquid are confined in intimate contact within the vessel, under pressure, and the pressure regulators 38 and 80 of the inlet and outlet conduit are set for different pressures so that the air is forced into the tank under a higher super-atmospheric pressure than that for which the vent pressure regulator 80 is set to enable the air and gas to efficiently pass through the liquids. The air is preferably of atmospheric temperature.

It is of course part of the process that the specific gravity of the gas may be varied, at will, by reducing or increasing the pressures at the pressure regulators, and the quality of the gas may be varied by adding to or decreasing the number of baffles or partitions which are intended to delay the progress of the air through the liquids in the pressure vessel.

An important feature in the production of the gas is the proportions of the water and the volatile combustible liquid, and the heating properties of the gas may be controlled by varying these proportions, as is readily understandable. Thus, for a very satisfactory gas for cooking, lighting, heating, and the like, water and volatile liquid, preferably gasoline, may be used in the respective proportions of water $33\frac{1}{3}\%$ and volatile combustible liquid $66\frac{2}{3}\%$. For this gas the pressure regulator on the inlet conduit may be set for 10 lbs. per square inch super-atmospheric, and the pressure regulator of the exit conduit line may be set for 2 lbs. super-atmospheric pressure, so that it can be seen that the pressure passing through the service line is considerably less than the pressure which permits the air to flow into the feed line for passage through the liquids in the tank B. For an efficient artificial gas for commercial use, such as lead burning, brazing, soldering, and for use in the operation of annealing ovens and blow pipes, water and volatile combustible liquid, which is preferably gasoline may be used in the respective proportions of water $33\frac{1}{3}\%$ to combustible liquid $66\frac{2}{3}\%$, and an inlet pressure of 15 lbs. super-atmospheric may be set for the pressure regulating valve of the inlet conduit, and an outlet pressure upon the pressure regulating valve 80 may be set for 5 lbs. super-atmospheric.

From the foregoing description of this invention it will be apparent that a novel process has been provided for manufacturing gas by passing air through water and a volatile liquid in intimate contact and properly baffling the same in the sphere of said liquids to effectively carburet the same. The apparatus used may vary considerably, but the apparatus herein described is the preferred embodiment.

Various changes in the steps of the process and in the apparatus used for effecting the process may be made without departing from the spirit of the invention or the scope of the claims herein defined.

We claim:

1. The process of manufacturing gas which consists in forcing air through water and a volatile combustible liquid in the proportion of said liquids of one part of water to two parts of volatile liquid, and baffling the air in its passage through both the water and the volatile liquid, whereby carburetted air gas is produced.

2. The method of manufacturing air gas which consists in confining stratified bodies of water and volatile combustible liquid under pressure, causing air to travel under a predetermined super-atmospheric pressure of from ten to fifteen pounds per square inch, through said water and volatile liquid so that the air travels over twice the distance through the volatile liquid as through the water, and venting the resultant air gas at a super-atmospheric pressure of two pounds.

3. The method of manufacturing air gas which consists in confining bodies of water and a volatile combustible liquid under pressure, causing air to travel under super-atmospheric pressure of less than 15 pounds per square inch through said water and volatile combustible liquid so that the air travels over a greater distance through the volatile combustible liquid than through the water to produce an air gas, and venting the air gas at super-atmospheric pressure less than the super-atmospheric pressure used to force the air through the water and volatile combustible liquid.

4. The method of manufacturing air gas which consists in confining stratified bodies of water and a volatile combustible liquid under super-atmospheric pressure of less than 15 pounds per square inch, causing atmospheric air to travel under such super-atmospheric pressure first through the water and then through the volatile combustible liquid, and baffling the air to a finely divided condition during passage through both the water and volatile combustible liquid.

MARION B. MacMILLAN.
EUGENE R. LANGLEY.